United States Patent
Sun

(10) Patent No.: US 10,096,998 B2
(45) Date of Patent: Oct. 9, 2018

(54) DISTRIBUTED REACTIVE POWER CONTROL IN POWER DISTRIBUTION SYSTEMS

(71) Applicant: Mitsubishi Electric Research Laboratories, Inc., Cambridge, MA (US)

(72) Inventor: Hongbo Sun, Plymouth, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 959 days.

(21) Appl. No.: 14/338,669

(22) Filed: Jul. 23, 2014

(65) Prior Publication Data

US 2016/0028235 A1    Jan. 28, 2016

(51) Int. Cl.
| | | |
|---|---|---|
| *H02J 3/16* | (2006.01) | |
| *H02J 3/18* | (2006.01) | |
| *H02J 13/00* | (2006.01) | |
| *G05B 15/02* | (2006.01) | |
| *G05F 1/10* | (2006.01) | |
| *H02J 3/38* | (2006.01) | |

(52) U.S. Cl.
CPC ............. *H02J 3/16* (2013.01); *G05B 15/02* (2013.01); *G05F 1/10* (2013.01); *H02J 3/18* (2013.01); *H02J 3/381* (2013.01); *H02J 13/0006* (2013.01); *Y02E 40/30* (2013.01)

(58) Field of Classification Search
CPC ...... H02J 3/16; H02J 3/381; H02J 3/18; H02J 13/0006; G05B 15/02; G05F 1/10; Y02E 40/30
See application file for complete search history.

(56) References Cited

U.S. PATENT DOCUMENTS

| | | | |
|---|---|---|---|
| 8,401,709 B2 | 3/2013 | Cherian et al. | |
| 2012/0022713 A1* | 1/2012 | Deaver, Sr. ............ | G05B 17/02 700/298 |
| 2013/0184894 A1 | 7/2013 | Sakuma et al. | |
| 2015/0094965 A1* | 4/2015 | Schneider ............ | G01R 21/133 702/58 |

* cited by examiner

*Primary Examiner* — Nathan L Laughlin
(74) *Attorney, Agent, or Firm* — Gene Vinokur; James McAleenan; Hironori Tsukamoto

(57) ABSTRACT

A method regulates voltages of a power distribution system that includes a substation transformer, at least one distributed energy resource (DER) for generating reactive power into the power distribution system, at least one DER controller operatively connected to the DER for controlling an amount of the generated reactive power, and a monitoring controller for monitoring a voltage violation on at least one phase of a monitored bus. The method determines an amount of reactive power required to compensate a voltage violation on the monitored bus using equivalent impedances of a path of the power distribution system between the substation transformer and the monitored bus and a shift of phase angle on the path, and transmits a request to provide the reactive power to compensate the voltage violation.

19 Claims, 9 Drawing Sheets

DISTRIBUTED REACTIVE POWER CONTROL IN POWER DISTRIBUTION SYSTEMS

FIELD OF THE INVENTION

The present invention relates generally to power distribution systems, and more particularly to distributed reactive power control of the power distribution systems using distributed energy resources (DERs).

BACKGROUND OF THE INVENTION

Compared with conventional utility-scale generation sources, such as fossil-fuel-fired and hydro power plants, the capacity of a DER is relatively small, but the location of DERs can be widely spread across the system. Examples of DERs include diesel engine-generators, wind turbines, photovoltaic units, fuel cells, and energy storages.

The DERs can be conveniently connected to an alternating current (AC) distribution grid. A DER can be used to generate an active power (symbolized as P), a reactive power (symbolized as Q), or combination of both. The reactive power generated by the DER influences the voltages of the grid. Specifically, the amount of reactive power is proportional to the voltages in the grid, i.e., when more reactive power is generated, the voltages in the grid increase, and when less reactive power is generated, the voltages decrease. Without proper regulation, a large number of DERs in distribution systems can cause system-wide violations of the voltage.

The violations of system voltages are usually handled by automatically controlled tap-changing under load transformers, set voltage regulators, and fixed or switched capacitors. However, existing equipment is not inherently designed to handle the variability introduced by DERs, and the lifetime of the equipment could be dramatically reduced due to the increased number of operations that they may perform.

A potential solution to this problem lies on the utilization of DERs to provide reactive power support for voltage regulation with proper control strategies. The effectiveness of system voltage controls through DERs is depended on the control and coordination method used in the power distribution system.

The centralized control and coordination methods are commonly used, see, e.g., U.S. 20130184894 and U.S. Pat. No. 8,401,709. Those methods use a centralized controller to make decisions based on system-wide information, such as bus voltages, and knowledge of all DER units in the systems. The controller issues a command to each distributed resource so that collectively they provide a requested reactive power.

Although the centralized control methods can effectively regulate the system voltages, those methods required a complicated communication network for real-time applications, and any fault or delay in communication at a bus or DER can affect the performance of overall voltage regulation.

Accordingly, there is a need for decentralized control of generation of reactive power in the power distribution systems with the DERs.

SUMMARY OF THE INVENTION

Various embodiments of the invention provide a system and a method for regulating voltages of a power distribution system including a substation transformer for providing power to loads through a set of buses connected by line segments. The power distribution system includes at least one distributed energy resource (DER) for generating reactive power into the power distribution system, at least one DER controller operatively connected to the DER for controlling an amount of the generated reactive power, and a monitoring controller for monitoring a voltage violation on at least one phase of a monitored bus Some embodiments of the invention are based on a realization that it is possible, for any monitoring controller to locally determine the amount of reactive power required to compensate the voltage violation on the monitored bus using only local information available to that monitoring controller. Such realization allows providing decentralized determination of the reactive power. Such realization also allows decentralizing of making the decisions for generating the requested amount of the reactive power as described below.

In some embodiments of the invention, each DER controller regulates the reactive power supplied by the DERs based on local voltage information. To that end, the DER controllers of some embodiments are configured to monitor violations on one or all three phases. Additionally or alternatively, the power distribution system can include a set of monitoring controllers for detecting the violation. Each monitoring controller is communicatively connected to one DER controller forming a set of clusters of the monitoring controllers connected to the same DER controller. In some embodiments, the DER controller can be a monitoring controller. Conversely, the monitoring controller is not a DER controller and can communicate with the DERs only through the DER controller of its cluster.

Some embodiments of the invention are based on a recognition that for proper distributed control of the power distributed system, an amount of reactive power required to compensate the voltage violation on a specific bus should be determined locally, i.e., based only on information available to controller monitoring that bus. This recognition contradicts to the common approach used in the power distribution systems. For example, commonly used sensitivity analysis approaches, such as Jacobian matrix based approach, to determine an amount of the reactive power to provide into the system require voltage information from an entire power distribution system, and/or require knowledge of the state of the other buses in the power distribution system.

In some embodiments of the invention, the DER controller adjusts the reactive powers of its DERs up to their capacities to maintain the voltages of its monitored buses within certain thresholds, and requests additional reactive power supports from the neighboring DERs through neighboring DER controllers when the DERs directly connected to the DER bus could not provide the requested reactive power. Some embodiments of the invention use distributed control method to coordinate and allocate the additional reactive power demand among DER buses with capacity surplus. Another realization that some embodiments are based on is that the voltage violations on the buses are more effectively corrected by the reactive power sources close to the buses with violations, and thus the commonly used even splitting method that allocate the total demand among participating parties evenly or proportional to their capacities are not well suitable for reactive power coordination. Instead, some embodiments of the invention allocate the total demand more favorable to the DERs of the neighboring DER controllers that is close to the monitored buses required the reactive power.

Accordingly, one embodiment of the invention discloses a method for regulating voltages of a power distribution system including a substation transformer for providing power to loads through a set of buses connected by line segments, wherein the power distribution system includes at least one distributed energy resource (DER) for generating reactive power into the power distribution system, at least one DER controller operatively connected to the DER for controlling an amount of the generated reactive power, and a monitoring controller for monitoring a voltage violation on at least one phase of a monitored bus. The method includes determining, using a processor of the monitoring controller upon detecting the voltage violation, an amount of reactive power required to compensate the voltage violation on the monitored bus using equivalent impedances of a path of the power distribution system between the substation transformer and the monitored bus and a shift of phase angle on the path; and transmitting a request to provide the reactive power to compensate the voltage violation.

Another embodiment discloses a monitoring controller for monitoring a voltage violation on a monitored bus of a power distribution system, including a sensor for measuring a voltage at the monitored bus; a memory for storing at least one threshold for values of the voltage and for storing equivalent impedances of a path of the power distribution system between a substation transformer and the monitored bus; a processor for determining a shift of phase angle on the path, for comparing the measured voltage with at least one threshold to determine the voltage violation, and for determining an amount of reactive power required to compensate the voltage violation using the equivalent impedances and the shift of phase angle; and a transmitter for transmitting a request to provide the amount of reactive power into the power distribution system to compensate the voltage violation.

Yet another embodiment discloses a power distribution system including a substation transformer for providing power to loads through a set of buses connected by line segments, including a set of distributed energy resource (DER) controllers, each DER controller is operatively connected to a set of DERs providing power to the power distribution system; a set of monitoring controller for detecting a voltage violation at corresponding monitored bus, each monitoring controller is communicatively connected to one DER controller forming a set of clusters of the monitoring controllers connected to the same DER controller; wherein each monitoring controller in the cluster of the DER controller determines an amount of reactive power required to compensate the voltage violation on the monitored bus using equivalent impedances of a path of the power distribution system between the substation transformer and the monitored bus and a shift of phase angle on the path and transmits the amount of reactive power to the DER controller; wherein the DER controller aggregates the requests for the reactive power received from the monitoring controllers in the cluster, requests the set of the DERs to generated the reactive power, and transmits residue of the reactive power to a neighboring DER controller, wherein the residue of the reactive power is determined based on the aggregated requests and capacity of the DERs in the set of DERs to generate the reactive power.

DETAILED DESCRIPTION OF THE PREFERRED EMBODIMENTS

Distribution Systems and Three-Phase Reactive Power Control

Figure 1:
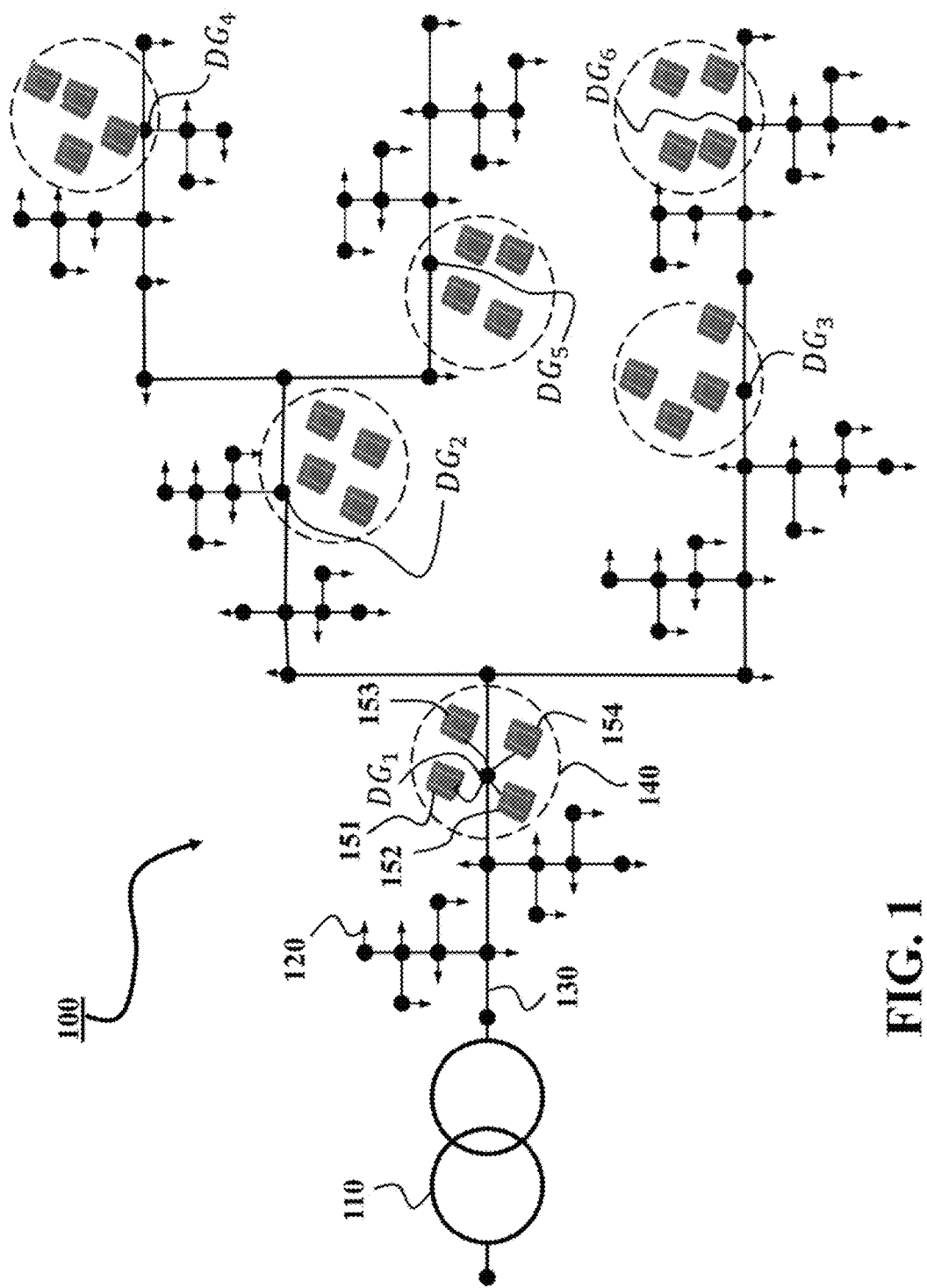
FIG. 1 is an example of a power distribution system according to various embodiments of an invention.

FIG. 1 shows an example of a power distribution system 100 that includes a distribution substation in which a three-phase transformer 110 receives electric power from power transmission systems, and provides the power to downstream loads 120 through power lines 130. The distribution system can include a set of buses connected with distributed energy resources (DERs). Those buses, e.g., a bus $DG_1$, a bus $DG_2$, a bus $DG_3$, a bus $DG_4$, a bus $DG_5$ and a bus $DG_6$, are referred herein as DER buses. The power distribution system 100 also includes DER controllers, such as a DER controller 140, arranged on corresponding DER buses and operatively connected with a set of DERs. For example the DER controller 140 of the DER bus $DG_1$ is connected with four photovoltaic units, e.g., the DER units 151, 152, 153 and 154. The loads, the DERs and the power lines can be of single-phase, double-phase, or three-phase. The distribution systems operate in a radial configuration.

The reactive power controls of the distribution system is achieved through reactive power and voltage regulation devices, including substation transformers, step voltage regulators, shunt capacitors, and distributed energy resources. The substation transformers, voltage regulators and shunt capacitors are most popular, and well suitable for regulating voltage changes with slow load and generation changes. In comparison, the distributed energy resources can adjust their reactive power rapidly, and well suitable for fast voltage variations caused by intermittent renewable resources and storage-capable loads. Some embodiments of the invention focus on the regulation and control of DERs, and assumed that the tap positions of transformers, regulators and energized capacitor units are fixed while regulating of distributed energy resources.

There are two factors that constrain the capacity of a DER-connected bus, or DER unit for reactive power support. The first one is that the total apparent power cannot exceed the rated capacity, as described in Eq. (1):

$$|Q_{i,s}| \leq \sqrt{(S_{i,s}^{max})^2 - (P_{i,s})^2} \qquad (1)$$

where, $P_{i,s}$ and $Q_{i,s}$ are the active power and reactive power supplied to bus i or unit i on phase s, $S_{i,s}^{max}$ is the maximal apparent power supplied to bus i or unit i on phase s.

The second one is that the power factor must be greater than a minimum allowed value, as described in Eq. (2):

$$|P_{i,s}| \geq pf^{min}\sqrt{(P_{i,s})^2+(Q_{i,s})^2} \qquad (2)$$

where, $pf^{min}$ is a minimal allowed power factor.

Local Determination of Reactive Power Compensating Local Voltage Violation

In some embodiments of the invention, each DER controller at a DER-bus regulates the reactive power supplied by the DERs based on local or system wide voltage information. When a centralized control mechanism is used, the reactive power regulation of each bus is based on the system-wide voltages. However, with a distributed control of the power distribution systems, it is desired to regulate the reactive power based on the voltages determined locally.

To that end, the DER controllers of some embodiments are configured to monitor violations on one or all three phases. Additionally or alternatively, the power distribution system can include a set of monitoring controllers for detecting the violation. Each monitoring controller is communicatively connected to one DER controller forming a set of clusters of the monitoring controllers connected to the same DER controller. In some embodiments, the DER controller can be a monitoring controller. Conversely, the monitoring controller is not a DER controller and can communicate with the DERs only through the DER controller of its cluster.

Figure 2:
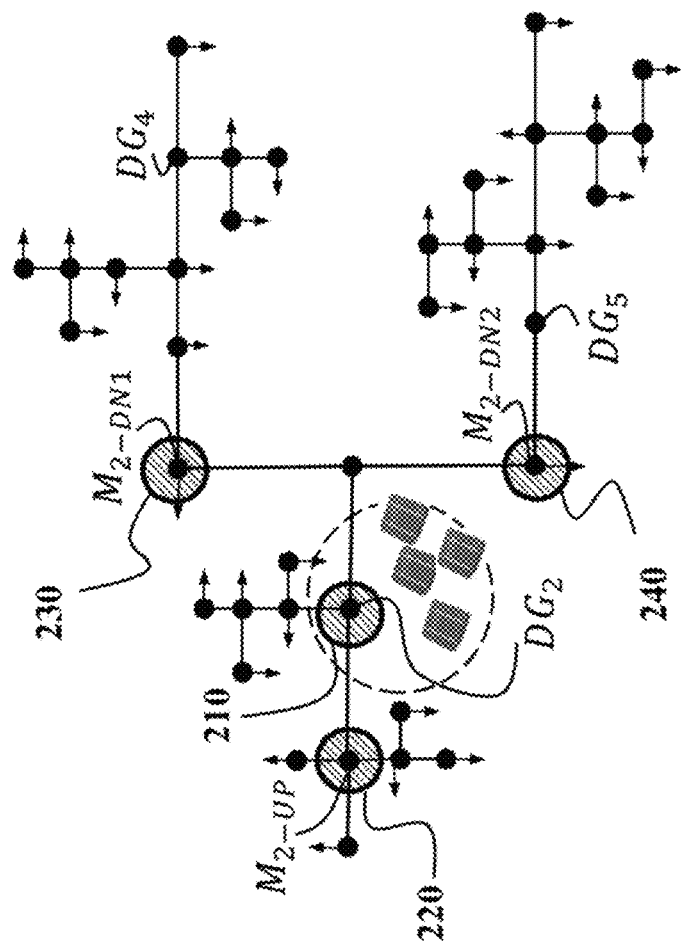
FIG. 2 is an example of a cluster in the power distribution system of FIG. 1.

FIG. 2 shows an example of a cluster of the DER controller 210 of the DER bus $DG_2$. In addition to the DER controller 210 and the DERs connected to the DER controller, the cluster includes three additional monitoring controllers, including one monitoring controller 220 for monitoring voltages on the monitored bus $M_{2-UP}$ located upstream of the DER controller, and two monitoring controllers 230 and 240 for monitoring voltages on the buses $M_{2-DN1}$, and $M_{2-DN2}$ located downstream of the DER controller. The DER controller 210 adjusts the total amount of reactive powers of supplied by the DERs connected at the DER bus $DG_2$ according to the voltage violations determined by the monitoring controllers of the cluster.

Some embodiments of the invention are based on a recognition that for proper distributed control of the power distributed system, an amount of reactive power required to compensate the voltage violation on a specific bus should be determined locally, i.e., based only on information available to controller monitoring that bus. This recognition contradicts to the common approach used in the power distribution systems. For example, commonly used sensitivity analysis approaches, such as Jacobian matrix based approach, to determine an amount of the reactive power to provide into the system require voltage information from an entire power distribution system, and/or require knowledge of the state of the other buses in the power distribution system.

However, some embodiments of the invention are based on a realization that it is possible, for any monitoring controller to locally determine the amount of reactive power required to compensate the voltage violation on the monitored bus using only local information available to that monitoring controller. Such realization allows providing decentralized determination of the reactive power. Such realization also allows decentralizing of making the decisions for generating the requested amount of the reactive power as described below.

Figure 3:
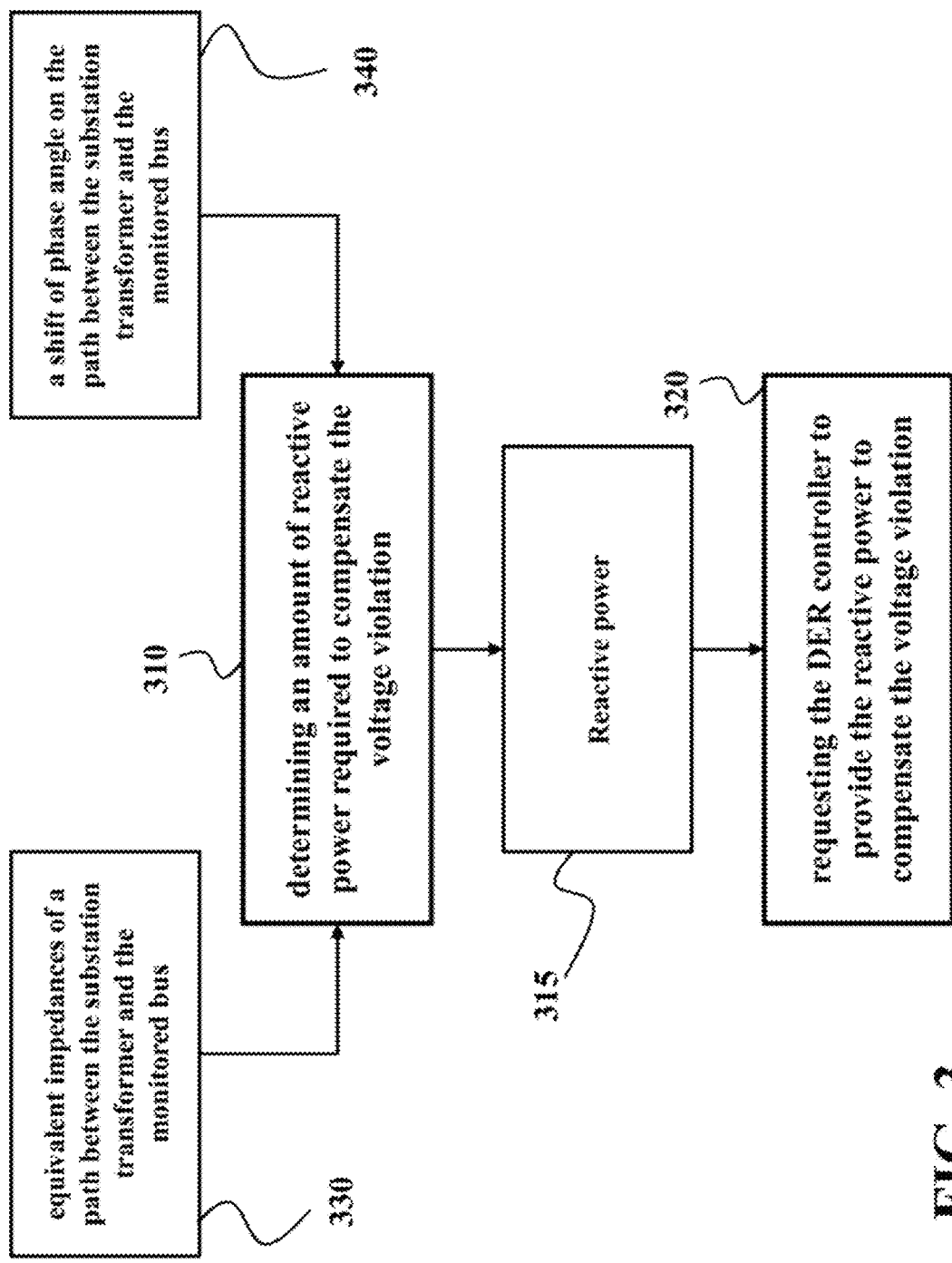
FIG. 3 is a flow chart for a method for regulating the voltages of the power distribution system according to some embodiments of the invention.

FIG. 3 shows a flow chart for a method for regulating the voltages of a power distribution system. The power distribution system, such as the system 100, can include a substation transformer for providing power to loads through a set of buses connected by line segments. The set of buses are controlled by a DER controller operatively connected to at least one distributed energy resource (DER) and a monitoring controller for detecting a voltage violation on at least one phase of the power distribution system.

According to various embodiments of the invention, the method determines 310 an amount of reactive power 315 required to compensate the voltage violation on the monitored bus using equivalent impedances 330 of a path of the power distribution system between the substation transformer and the monitored bus and a shift of phase angle 340 of the voltage on the path and requests 310, e.g., the DER controller, e.g., of its cluster, to provide the reactive power 315 to compensate the voltage violation.

Notably, each monitoring controller monitoring the monitored bus can determine the equivalent impedances 330 and the shift of phase angle 340 locally based on the information available or determined by the monitoring controller. For example, in some embodiments, the path is a shortest path formed by a set of line segments connecting a primary side of the substation transformer and the monitored bus. The path usually is constant during at least some time of operation of the power distribution system and can be determined by the topology of the system. Thus, the attributes and/or parameters of the path can be predetermined.

Figure 4:
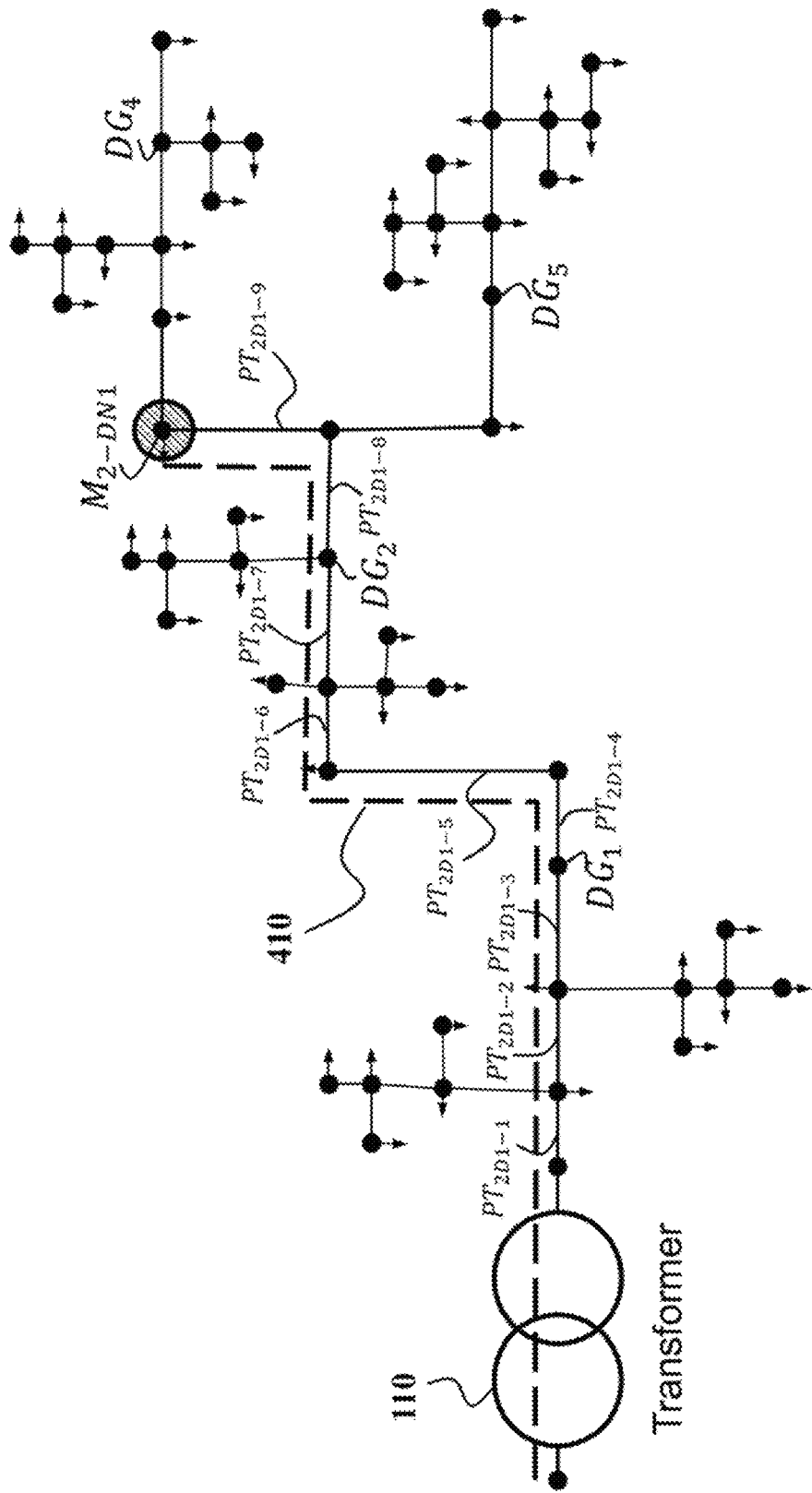
FIG. 4 is an example of the path between the primary side of the substation transformer 110 and a monitored bus used by some embodiments of the invention to determine the reactive power.

FIG. 4 shows an example of the path between the primary side of the substation transformer 110 and a monitored bus, $M_{2-DN1}$. The path is formed by all energized devices located between the primary side of the substation and the monitored bus, and includes nine power line segments, $PT_{2D1-1}$, $PT_{2D1-2}$, $PT_{2D1-3}$, $PT_{2D1-4}$, $PT_{2D1-5}$, $PT_{2D1-6}$, $PT_{2D1-7}$, $PT_{2D1-8}$, and $PT_{2D1-9}$.

For a monitored bus i, a set of incremental voltage changes for compensating the voltage violation on the monitored bus can be determined according to:

$$\Delta|V_{i,s}| = V_i^{min} - |V_{i,s}| \text{ if } |V_{i,s}| < V_i^{min},$$

$$\Delta|V_{i,s}| = 0 \text{ if } V_i^{min} \leq |V_{i,s}| \leq V_i^{max},$$

$$\Delta|V_{i,s}| = V_i^{max} - |V_{i,s}| \text{ if } |V_{i,s}| > V_i^{max},$$

$$s \in \{a,b,c\}, \qquad (3)$$

where, $|V_{i,s}|$ is the magnitude of voltage at the monitored bus i on phase s, $V_i^{min}$ and $V_i^{max}$ are the lower and upper bounds for the permissible magnitudes of voltages at bus i, $\Delta|V_{i,s}|$ is the required voltage change for compensating the voltage violation at bus i on phase s.

The required changes for reactive powers at any bus can be determined based on the equivalent impedance and phase angle shifting on the shortest path between the primary side of the substation transformer and the monitored bus under consideration.

The angle shifts between the primary side of the substation transformer and bus i on each phase can be determined through an aggregated voltage amplifying factor matrix, $A_{V_i}$ that introduced by the transformers or voltage regulators or phase jumpers along the shortest path between the substation and the bus i according to $$A_{V_i} = \Pi_{ud} A_{V_{ud}} \qquad (4)$$

where, $A_{V_{ud}}$ is the voltage amplifying factor matrix of a voltage regulator, transformer or phase jumper between two buses u and d on the path from the substation to the monitored bus i. In the example of FIG. 4, the aggregate voltage amplifying matrix is determined by the phase winding connections of the substation transformer.

The equivalent impedance of the path between the primary side of the substation transformer and bus i, $Z_i^{Eqv}$ can be determining by aggregating the impedance matrices for each line segment on the path. Taken FIG. 4 as example, the equivalent impedance is the summation of impedance matrices for nine line segments, $PT_{2D1-1}$, $PT_{2D1-2}$, $PT_{2D1-3}$, $PT_{2D1-4}$, $PT_{2D1-5}$, $PT_{2D1-6}$, $PT_{2D1-7}$, $PT_{2D1-8}$, and $PT_{2D1-9}$.

To achieve the incremental voltage changes described in Eq. (3), the required current injection changes at bus i are determined as:

$$\begin{bmatrix} \Delta I_{i,a}^Q \\ \Delta I_{i,b}^Q \\ \Delta I_{i,c}^Q \end{bmatrix} = \begin{bmatrix} Z_{i,aa}^{Eqv} & Z_{i,ab}^{Eqv} & Z_{i,ac}^{Eqv} \\ Z_{i,ba}^{Eqv} & Z_{i,bb}^{Eqv} & Z_{i,bc}^{Eqv} \\ Z_{i,ca}^{Eqv} & Z_{i,cb}^{Eqv} & Z_{i,cc}^{Eqv} \end{bmatrix} \begin{bmatrix} \Delta|V_{i,a}|e^{j(\angle A_{V_{i,a}}+0°)} \\ \Delta|V_{i,b}|e^{j(\angle A_{V_{i,b}}-120°)} \\ \Delta|V_{i,c}|e^{j(\angle A_{V_{i,c}}+120°)} \end{bmatrix}, \quad (5)$$

where, $e^{j(\cdot)}=\cos(\cdot)+j\sin(\cdot)$, j is an imaginary unit of a complex number; $\Delta|V_{i,a}|$, $\Delta|V_{i,b}|$ and $\Delta|V_{i,c}|$ are the amount of required voltage magnitude changes at bus i on phase a, b and c; $\angle A_{V_{i,a}}$, $\angle A_{V_{i,b}}$ and $\angle A_{V_{i,c}}$ are the phase angle shifts between the primary side of the substation and bus i on phase a, b and c, and given by Eq. (4); $\Delta I_{i,a}^Q$, $\Delta I_{i,b}^Q$ and $\Delta I_{i,c}^Q$ are the required current injections for phase a, b and c; $Z_i^{Eqv}$ is a 3-by-3 matrix of equivalent impedance between the substation transformer and the monitored bus with voltage violation, and $Z_{i,st}^{Eqv}$ is the element of equivalent impedance matrix at the row corresponding to phase s and the column corresponding to phase i.

The reactive power changes at monitored bus i are determined according to:

$$\Delta \tilde{Q}_{i,a} = \text{Im}\{|V_{i,a}|e^{j(\angle A_{V_{i,a}}+0°)}\text{conj}(\Delta I_{i,a}^Q)\}, \quad (6)$$

$$\Delta \tilde{Q}_{i,b} = \text{Im}\{|V_{i,b}|e^{j(\angle A_{V_{i,b}}-120°)}\text{conj}(\Delta I_{i,b}^Q)\}, \quad (7)$$

$$\Delta \tilde{Q}_{i,c} = \text{Im}\{|V_{i,c}|e^{j(\angle A_{V_{i,c}}+120°)}\text{conj}(\Delta I_{i,c}^Q)\}, \quad (8)$$

where, Im(•) is an imaginary part of a complex number, and conj(•) is a conjugate of the complex number; $\Delta \tilde{Q}_{i,a}$, $\Delta \tilde{Q}_{i,b}$ and $\Delta \tilde{Q}_{i,c}$ are the required amount of reactive power to compensate the voltage violation at the monitored bus i on phases a, b and c; $|V_{i,a}|$, $|V_{i,b}|$ and $|V_{i,c}|$ are measured voltage magnitudes of bus i on phase a, b and c.

Figure 5:
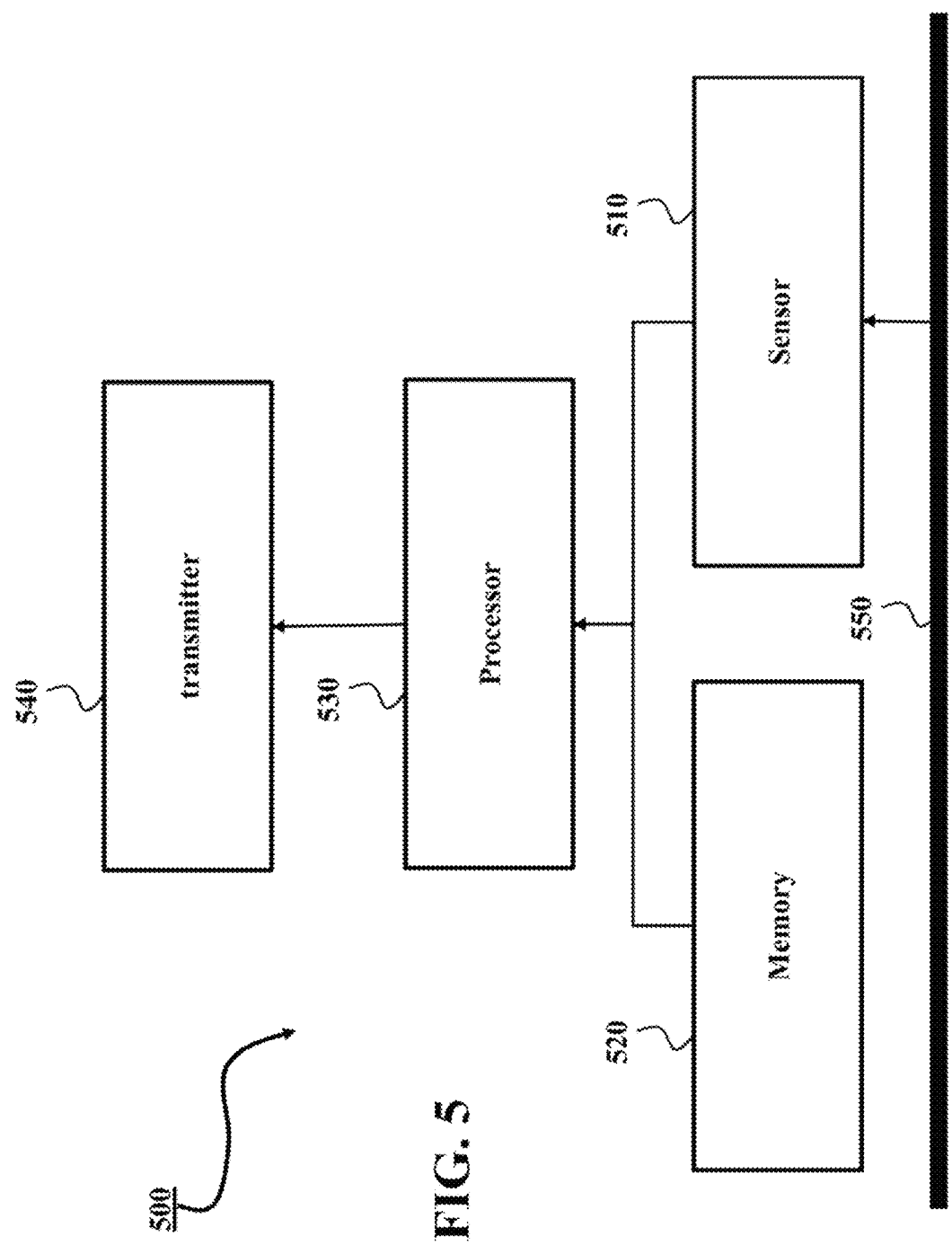
FIG. 5 is a block diagram of an exemplar monitored bus according to some embodiments of the invention.

FIG. 5 shows a block diagram of an exemplar monitoring controller 500. The monitoring controller 500 includes a sensor 510 for measuring the voltage on the bus 550 for determining the voltage violation, a memory 520 for storing, e.g., equivalent impedances of a path of the power distribution system between the substation transformer and the bus, and a processor 530 for determining a shift of phase angle on the path and for determining an amount of reactive power required to compensate the voltage violation using the equivalent impedances and the shift of phase angle.

The sensor 510 can be configured to measure the voltage on a phase of the bus 550 that is below or above a predetermined threshold. Additionally or alternatively, the sensor can measure the current voltage on the bus, and the processor 530 can determine the voltage violation by comparing the measure voltage with thresholds. The thresholds can be stored in the memory 520.

The equivalent impedances of a path of the power distribution system between the substation transformer and the bus 550 can be predetermined and stored in the memory 520. Additionally or alternatively, various values of the components of the power distribution system can be stored into the memory, and the processor 530 can determine the equivalent impedances based on those values to determine the amount of reactive power. For example, the memory can store the values of impedance matrix of three phases for each line segments of the path.

The monitoring controller 500 also includes a transmitter 540 for transmitting a request to provide the amount of reactive power into the power distribution system to compensate the voltage violation. In some embodiments, the transmitter 540 is a transceiver for both transmitting and receiving information. In various embodiments, the transmitter transmits the request to an upstream or downstream DER controller along the line segments of the power distribution system.

In some embodiments, each monitoring controller in the cluster of the DER controller determines an amount of reactive power required to compensate the voltage violation on the monitored bus and requests the DERs of the cluster to compensate for the voltage violations. The DER controller aggregates the requests for the reactive power received from the monitoring controllers in the cluster, requests the corresponding DER to generated the reactive power, and transmits residue of the reactive power to neighboring DER controllers, wherein the residue of the reactive power is determined as amount of the aggregated requests that are over the capacity of the corresponding DER to generate the reactive power.

For example, the aggregated reactive power changes can be determined by the DER controller at bus i according to:

$$\Delta Q_{i,s} = \frac{A_u \Delta \tilde{Q}_{u,s} + A_i \Delta \tilde{Q}_{i,s} + \sum_{d \in DN_i} A_d \Delta \tilde{Q}_{d,s}}{A_u + A_i + \sum_{d \in DN_i} A_d} \quad s \in \{a, b, c\} \quad (9)$$

where, $\Delta Q_{i,s}$ is the averaged change of reactive power injection at bus i on phase s; $A_u$, $A_i$ and $A_d$ are the availability of voltage violation at bus u, bus i and bus d; bus u and bus d are located upstream and downstream to bus i respectively; $DN_i$ is the set of monitored buses directly downstream to bus i. $\Delta \tilde{Q}_{u,s}$ and $\Delta \tilde{Q}_{d,s}$ are the required changes of reactive power injection at bus u and d on phase s.

Taking the DER controller of the DER bus $DG_2$ in FIG. 2 as example, its required changes for reactive power are determined by averaging the required reactive powers for all its monitored buses with voltage violation, such as the bus $DG_2$, the bus $M_{2-UP}$, the bus $M_{2-DN1}$, and the bus $M_{2-DN2}$.

Added the determined incremental reactive powers with the current reactive powers, the required total reactive powers for a DER-bus i on phase s, $Q_{i,s}$ can be obtained. This required reactive power is bounded by its upper and lower bounds as:

$$Q_{is}^{min} \leq Q_{i,s} \leq Q_{is}^{max}, \quad (10)$$

where, $Q_{is}^{max}$ and $Q_{is}^{min}$ in are the upper and lower bounds, i.e., thresholds, for reactive power at bus i on phase s, and defined as:

$$Q_{is}^{max} = \min\left\{\sqrt{(S_{i,s}^{max})^2 - (P_{i,s})^2}, |P_{i,s}|\frac{\sqrt{1-(pf^{min})^2}}{pf^{min}}\right\} \quad (11)$$

$$Q_{is}^{min} = -Q_{is}^{max}. \quad (12)$$

If the required reactive powers are within the thresholds as described in Eq. (10), the DER controller will instruct the DERs to generate the required amount of reactive powers to correct the voltage violations on its monitored bus. If the required powers are greater than upper thresholds, additional capacitive reactive powers from neighboring DER-buses are needed. Similarly, additional inductive reactive power supports from neighboring DER-buses are required, when the required powers are less than lower thresholds.

Accordingly, the reactive powers for any DER-bus i on any phase s, $Q_{i,s}$ can be divided into three components:

$$Q_{i,s} = Q_{i,s}^{loc} + Q_{i,s}^{cap} - Q_{i,s}^{ind} \, s \in \{a,b,c\}, \quad (13)$$

where, $Q_{i,s}^{loc}$ is the reactive power used to support its own voltage, $Q_{i,s}^{cap}$ and $Q_{i,s}^{ind}$ are the capacitive and inductive reactive powers used to assist mitigating the over lower and upper voltage thresholds of neighbor DER-buses.

The reactive power for supporting its own voltage are determined according to:

$Q_{i,s}^{loc} = Q_{i,s}^{min}$ if $Q_{i,s} < Q_{i,s}^{min}$, $Q_{i,s}^{loc} = Q_{i,s}$ if $Q_{i,s}^{min} \leq Q_{i,s} \leq Q_{i,s}^{max}$, $Q_{i,s}^{loc} = Q_{i,s}^{max}$ if $Q_{i,s} > Q_{i,s}^{max}$, $s \in \{a,b,c\}$ (14)

where, $Q_{i,s}^{loc}$ is determined by the local controller at bus i.

The capacitive and inductive reactive powers are independently determined through iterative coordination processes between all DER-buses to enable reactive powers of all DER-buses within their thresholds while maximally correcting the voltage violations in the system.

The initial setting of capacitive reactive power for mitigating lower-bound voltage violations at its neighbor buses are determined according to:

$Q_{i,s}^{cap}[0] = 0$ if $Q_{i,s} \leq Q_{i,s}^{max}$ $Q_{i,s}^{cap}[0] Q_{i,s} - Q_{i,s}^{max}$ if $Q_{i,s} > Q_{i,s}^{max}$ $s \in \{a,b,c\}$ (15)

The capacities of the capacitive reactive power are determined as:

$Q_{i,s}^{cap,max} = Q_{i,s}^{max} - Q_{i,s}$ if $Q_{i,s} < Q_{i,s}^{max}$ $Q_{i,s}^{cap,max} = 0$ if $Q_{i,s} \geq Q_{i,s}^{max}$ $s \in \{a,b,c\}$ (16)

The initial setting of inductive reactive power for mitigating upper-bound voltage violations at its neighbor buses are determined according to:

$Q_{i,s}^{ind}[0] = 0$ if $Q_{i,s} \geq Q_{i,s}^{min}$ $Q_{i,s}^{ind}[0] = Q_{i,s}^{min} - Q_{i,s}$ if $Q_{i,s} < Q_{i,s}^{min}$ $s \in \{a,b,c\}$ (17)

The capacities of inductive reactive power are determined as:

$Q_{i,s}^{ind,max} = Q_{i,s} - Q_{i,s}^{min}$ if $Q_{i,s} \geq Q_{i,s}^{min}$ $Q_{i,s}^{ind,max} = 0$ if $Q_{i,s} < Q_{i,s}^{min}$ $s \in \{a,b,c\}$ (18)

Distributed Control of DER Controllers at DER Buses

The DER controllers regulate the reactive power provided by the DERs based on the local measured voltages on its monitored buses, and communications with neighboring DER controllers located upstream and downstream from the DER controller.

Figure 6:
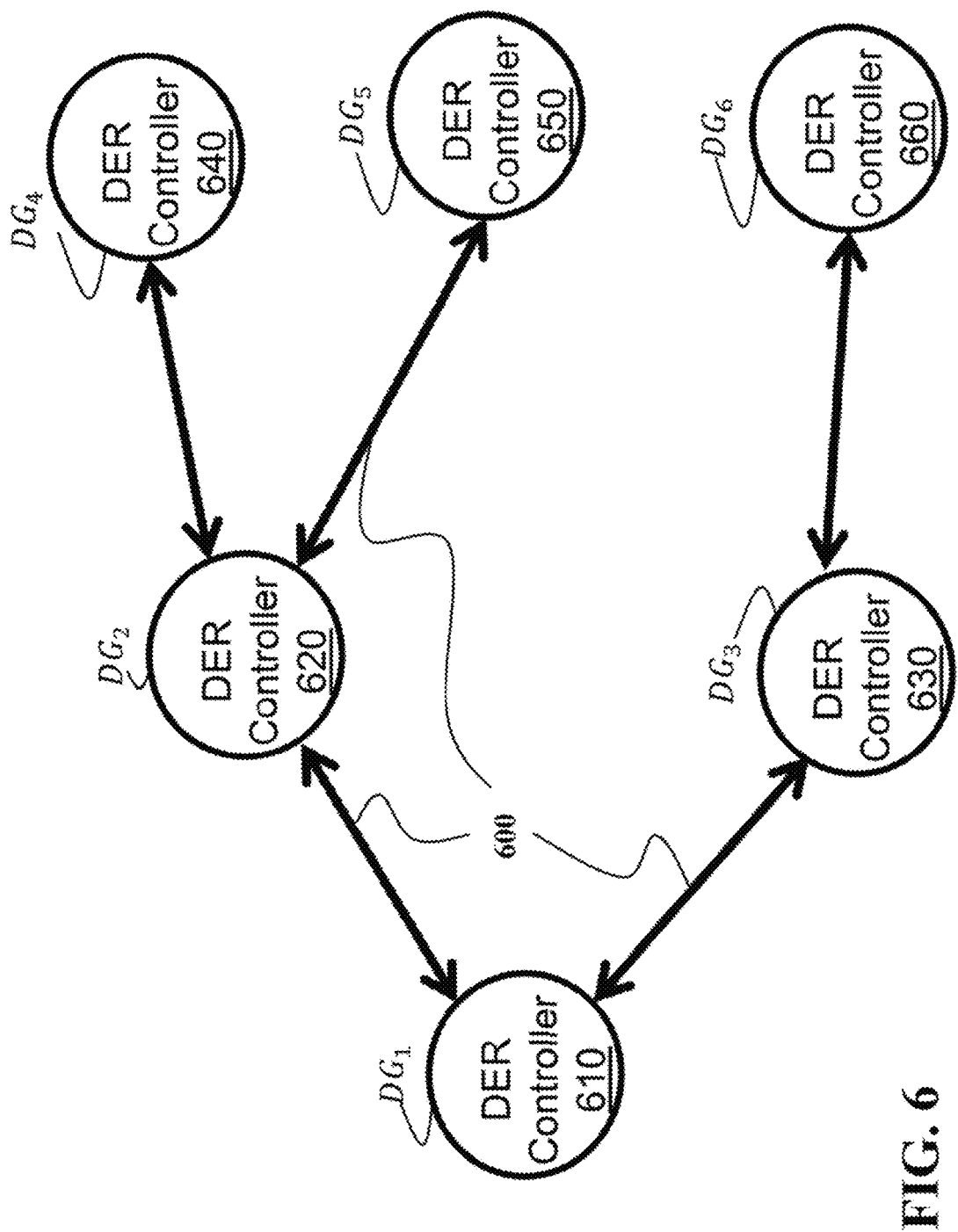
FIG. 6 is a schematic of communication paths between DER controllers of buses for the power distribution system in FIG. 1 according to some embodiments of the invention.

FIG. 6 shows a schematic of communication paths between DER controllers of the distribution system in FIG. 1. A DER controller has a bi-way communication 600 with its neighboring DER controllers located at its upstream and downstream. For example, the DER controller 620 of the DER bus $DG_2$ has bi-way communications with the DER controller 610 of the bus $DG_1$ at its upstream, and the DER controllers 640 and 650 of the buses $DG_4$ and $DG_5$ at its downstream. The DER controller 610 of the DER bus $DG_1$ does not have any DER controller at its upstream, so the DER controller 610 communicates only with the DER controllers at its downstream. Similarly, the DER controllers 640, 650, and 660 of the DER buses $DG_4$, $DG_5$, and $DG_6$, do not have DER controllers at their downstream, and only communicate with the DER controllers at their upstream.

The DER controller adjusts generation of the reactive power by its DERs to maintain the voltages for all phases of its monitored buses within certain thresholds imposed by performance specifications. If the DERs directly connected to the DER bus can provide the requested reactive power, the DERs are instructed to produce the reactive power up to their maximum/minimum capacity. The excess of the reactive power is requested from the neighboring DERs through neighboring DER controllers.

As described in Eq. (13), the reactive powers for each DER-bus on a phase has three components, the local reactive power component is fully determined by the local DER controller, but for the capacitive and inductive reactive power components, after their initial values are set by local DER controllers, their final settings are determined through iterative coordination between all DER buses. Accordingly, the DER controller needs three steps to determine its total demands of reactive powers from its DERs. The first step is determining the reactive powers for local voltage support needs, and the second and third steps are two independent iterative processes to determine the capacitive and inductive reactive powers for assisting voltage regulation for neighboring DER controllers.

The reactive power coordination between DER buses can be either centralized or distributed. In some embodiments of the invention, the distributed control mechanism is used. Some embodiments are based on another realization that, in a power distribution system, the voltage violations on the buses are more effectively corrected by the reactive power sources close to the buses with violations, and the farther the source from the buses with violations, the less effective the source corrects the voltage violations. Thus, the commonly used distributed control strategy, i.e. even splitting strategy that allocates the total demand among participating parties evenly or proportional to their capacities, is not well suitable for reactive power coordination between DER buses. Instead, some embodiments of the invention allocate the total demand more favorable to the DERs of the DER-buses that are closer to the monitored buses required the reactive power.

The residual splitting method described below is used for both capacitive and inductive reactive power determinations for DER controllers. This method has divided the corresponding reactive power component into a feasible component, i.e., the portion of reactive power within the thresholds, and a residual component, i.e., the portion of reactive power beyond the thresholds. For each iteration, the sum of residual reactive powers for all DER-buses are partitioned into each DER-bus, and the DER buses close to the buses with the residuals give more shares of the total residuals. Through the iterations, the sum of residuals is gradually to decrease to zero, and each DER-bus only have feasible reactive powers if the total capacities of DER-buses are greater than the total demand.

Let $x_i$ be the positive reactive power determined for bus i, and the goal of this method is to determine a feasible solution that enable its value within its lower and upper bounds:

$$0 \leq x_i^{min} \leq x_i \leq x_i^{max} \quad (19)$$

wherein $x_i^{max}$ and $x_i^{min}$ is the non-negative maximal and minimal capacities of bus i. For example, for a capacitive reactive power determination on a phase s, $x_i$ and $x_i^{max}$ are set as the capacitive reactive power and its capacity of bus i on phase s, $Q_{i,s}^{cap}$, and $Q_{i,s}^{cap,max}$. $x_i^{min}$ can be set as zero.

One embodiment partitions the reactive power determined by each DER controller into two parts, one is a feasible part that lies within its upper and lower bounds, $x_i$, and the other is a residual part, $\Delta x_i$ that is the amount of reactive powers beyond the bounds. An iterative process is used to update the feasible and residual powers of each bus and distributing the production of the residual power between neighboring DER controllers iteratively until a converged solution is obtained. For practical consideration, in one embodiment the iterative process is terminated when a given number of iterations are reached.

At each step of the iterations, the current residual value of each bus is allocated half to the bus itself, and half to the buses that can receive information from the study bus. For example, the current feasible and residual values of bus i at current step k are $x_i[k]$ and $\Delta x_i[k]$. The numbers of neighbor buses that bus i can transmit information to is $D_i^{out}$. The shares for bus i and any bus adjacent to bus i of residual power $\Delta x_i[k]$ is $\frac{1}{2}\Delta x_i[k]$ and $$\frac{1}{2D_i^{out}}\Delta x_i[k]$$

respectively. The new feasible and residual values for bus i at next step (k+1) can be determined by checking against its lower and upper bounds with an aggregate value determined by aggregating its current feasible value and all residual shares allocated from itself, and all buss that can send information to it from current step k together.

This aggregate value is determined as $$\left(x_i[k] + \frac{1}{2}\Delta x_i[k] + \sum_{j \in N_i^{in}} \frac{1}{1+D_j^{out}}\Delta x_j[k]\right), N_i^{in}$$

is the set of buss that can transmit information to bus i, $\Delta x_j[k]$ is the residual value of bus j at step k, $D_j^{out}$ is the number of buss that bus j can transmit information to. The portion within the bounds is the new feasible value, and the portion beyond the bounds is the new residual value.

The feasible and residual powers are updated according to:

$$\tilde{x}_i[k+1] = x_i[k] + \frac{1}{2}\Delta x_i[k] + \sum_{j \in N_i^{in}} \frac{1}{1+D_j^{out}}\Delta x_j[k]) \quad (20)$$

$$x_i[k+1] = x_i^{min} \quad \text{if } \tilde{x}_i[k+1] < x_i^{min} \quad (21)$$
$$x_i[k+1] = \tilde{x}_i[k+1] \quad \text{if } x_i^{min} \leq \tilde{x}_i[k+1] \leq x_i^{max}$$
$$x_i[k+1] = x_i^{max} \quad \text{if } \tilde{x}_i[k+1] > x_i^{max}$$

$$\Delta x_i[k+1] = \tilde{x}_i[k+1] - x_i^{min} \quad \text{if } \tilde{x}_i[k+1] < x_i^{min} \quad (22)$$
$$\Delta x_i[k+1] = 0 \quad \text{if } x_i^{min} \leq \tilde{x}_i[k+1] \leq x_i^{max}$$
$$\Delta x_i[k+1] = \tilde{x}_i[k+1] - x_i^{max} \quad \text{if } \tilde{x}_i[k+1] > x_i^{max}$$

where, $\tilde{x}_i[k+1]$ is an aggregation of current feasible powers and shares of residual powers. $x_i[k+1]$ and $\Delta x_i[k+1]$ are the feasible and residual reactive powers of bus i at step (k+1). The initial conditions for feasible and residual powers at bus i, $x_i[0]$, $\Delta x_i[0]$ is determined according to the reactive power requests described above. After a given number of iterations, the additional capacitive or inductive reactive power supplied by bus i, $x_i$ are set as:

$$x_i = x_i[m], \quad (23)$$

where m is a predetermined number.

Using this method, each DER controller only needs local information from itself and neighbors to make decisions. At each iterative step, each DER controller only needs to send the amount of shares for its residual reactive power to its neighboring controllers, and receives the amount of shares of other residual reactive powers from its neighboring controllers.

Figure 7:
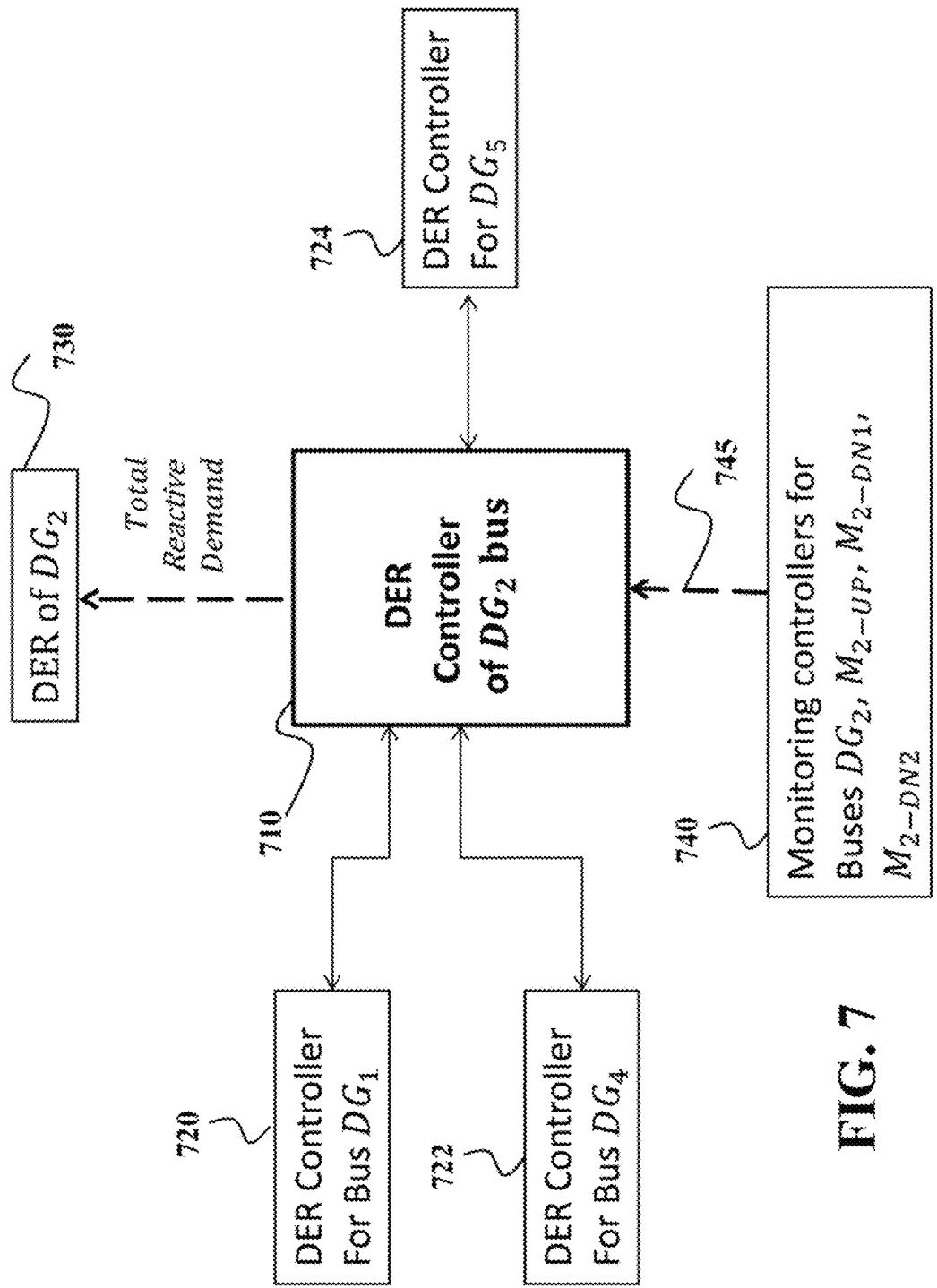
FIG. 7 is a block diagram of the information exchange between various controllers according to some embodiments of the invention.

FIG. 7 shows a block diagram of the information exchange for the DER controller 710 of the DER bus $DG_2$. The controller 710 starts the iterative process upon receiving requests 745 for the reactive power from the monitoring controllers 740 of monitored buses $DG_2$, $M_{2\text{-}UP}$, $M_{2\text{-}DN1}$, and $M_{2\text{-}DN2}$, sensing the voltage violation. During the iterations, the controller 710 also can receives information about their shares of residual reactive powers from controllers 720, 722, and 724 of its neighboring DER buses $DG_1$, $DG_4$, and $DG_5$, and sends information about its share of residual reactive powers to the controllers 720, 722, and 724 of its neighboring DER buses $DG_1$, $DG_4$, and $DG_5$. When the given number of iterations reached, the controller 710 sends a command to a DER 730 of the DER buses $DG_2$ with the total demand of the reactive power, which can include the portion of the request 745 and portions of the requests received from the controllers 720, 722, and 724.

Distributed Control of DER Units at a DER Bus

In some embodiments, each DER has an independent unit controller for adjusting its reactive power generation according to the total amount of reactive power determined for the DER controller. The control of DERs can be either centralized or distributed. In some embodiments, the distributed control mechanism is used. For a bus connected with DERs, the amount of the reactive power determined at the DER controller is allocated among each DER that connected to the bus. In some embodiments, the request for the reactive power is sent only to controller of one, e.g., a leading, DER, and the DERs interact among themselves and through iterations allocate the reactive power to each DER according to their capacities.

Figure 8:
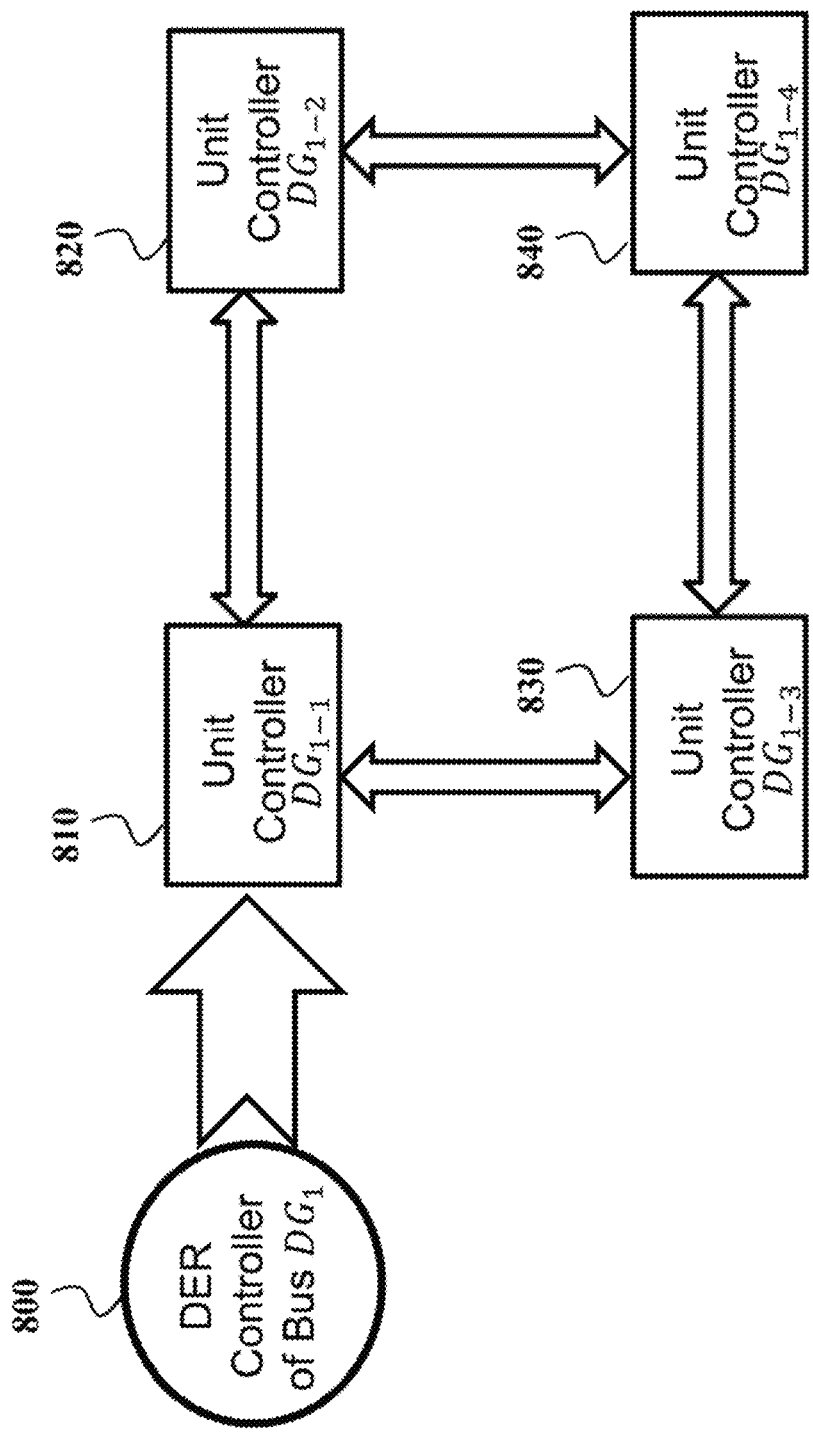
FIG. 8 is an example of interactions among a DER controller of a bus and controllers of DER units connected to the bus.

FIG. 8 shows an example of interactions among a DER controller 800 of bus $DG_1$ and corresponding unit controllers for the DER units connected to the bus. The bus, $DG_1$ has connected with four units, $DG_{1\text{-}1}$ 810, $D_{G1\text{-}2}$ 820, $DG_{1\text{-}3}$ 830 and $DG_{1-4}$ 840. Each unit has two-way communications with its neighbor units. One of the units is selected as the leading unit to receive command from the DER controller at the bus. For example, unit $DG_{1-1}$ 810 is selected as the leading unit for communication with the DER controller 800.

The DER controller at the DER bus issues a command demanding an amount of reactive power to a leading unit controller. After the leading unit controller receives the command, an iterative exchange of information between unit controllers begins: each controller connected to the bus exchanges information with its neighboring controller. The objective of this information exchange is to distribute the required amount of reactive power among all the units such that after several rounds of exchanges, each unit keeps a fraction of total demand, such that collectively the units provide the total amount of reactive power demanded by the bus controller.

In one embodiment, each unit controller is represented as a node of a directed graph to allocate the requested reactive power demand to each DER according to the capacities of DERs. It is assumed that the requested reactive power for a DER-bus is positive, and the negative of the requested power is used for the solution process when the requested power for a DER-bus is a negative number.

Let $x_i$ be the positive reactive power of node i, and its feasible value is constrained by an non-negative lower bound, $x_i^{min}$ and an non-negative maximal bound, $x_i^{max}$. The initial condition for the reactive power of node i is given by $x_i[0]$.

The solution method executes two iterative processes in parallel. The goal of the first process is to evenly partition the total demand into each node, and the second one is to evenly partition the sum of unit capacities into each node. After two processes converged, a feasible solution of reactive power for each unit can be determined based on two converged solutions for each node. For practical consideration, the iterative processes are terminated when a given number of iterations are reached.

At each step of iterations, the current value of each node is evenly split into the node itself and nodes can receive information from the study node. For example, the current value of node i at current step k is $x_i[k]$, and the numbers of neighbor nodes that node i can transmit information to is $D_i^{out}$. The share for node i and any node adjacent to node i of $x_i[k]$ is $$\frac{1}{1+D_i^{out}} x_i[k].$$

The new value of node i at next step (k+1) is set as a sum of all shares allocated from itself, and all nodes that can send information to node i from current step k, $$\sum_{j \in \{i \cup N_i^{in}\}} \frac{1}{1+D_j^{out}} x_j[k],$$

$N_i^{in}$ is the set of nodes that can transmit information to node i; $x_j[k]$ is the reactive power of node j at step k, $D_j^{out}$ is the number of nodes that node j can transmit information to.

The first iterative process is used to update the reactive powers of nodes according to:

$$x_i^1[k+1] = \sum_{j \in \{i \cup N_i^{in}\}} \frac{1}{1+D_j^{out}} x_j^1[k], \quad (24)$$

where, $x_i^1[k]$ and $x_i^1[k+1]$ are the values of reactive powers of node i at the step k, and step (k+1). The initial condition of $x_i^1[k]$ is set as:

$$x_i^1[0] = x_i[0] - x_i^{min}. \quad (25)$$

The second iterative process is used to update the capacities of nodes according to:

$$x_i^2[k+1] = \sum_{j \in \{i \cup N_i^{in}\}} \frac{1}{1+D_j^{out}} x_j^2[k], \quad (26)$$

where, $x_i^2[k]$ and $x_i^2[k+1]$ are the values of capacities of node i at the step k, and step (k+1). The initial condition of $x_i^2[k]$ is set as:

$$x_i^2[0] = x_i^{max} - x_i^{min}. \quad (27)$$

After specified number of iterations, m, the final solution for reactive power supplied by node i, $x_i$ can be determined as:

$$x_i = x_i^{min} + \frac{x_i^1[m]}{x_i^2[m]} (x_i^{max} - x_i^{min}). \quad (28)$$

Depended on the configuration of communications between nodes, the solution method does not necessarily split the demand among all nodes proportional to node capacities, but it does ensure that the overall demand is collectively met and the reactive power being demanded from each node does not exceed its capacity limit if the total demand is not greater than total capacity limit. If there is no enough information for determining whether the total demand is less than total capacity limit, then the reactive power supplied by node i, $x_i$ will be checked against its capacity limit, and set to its value as its limit when it is over the limit.

Using this solution method, each unit controller only needs local information from itself and neighbors to make decisions. At each iterative step, each node only needs to send the amount of shares for its reactive power and capacity to its neighbor nodes, and receives the shares of other node's reactive power and capacity from its neighbor nodes.

Figure 9:
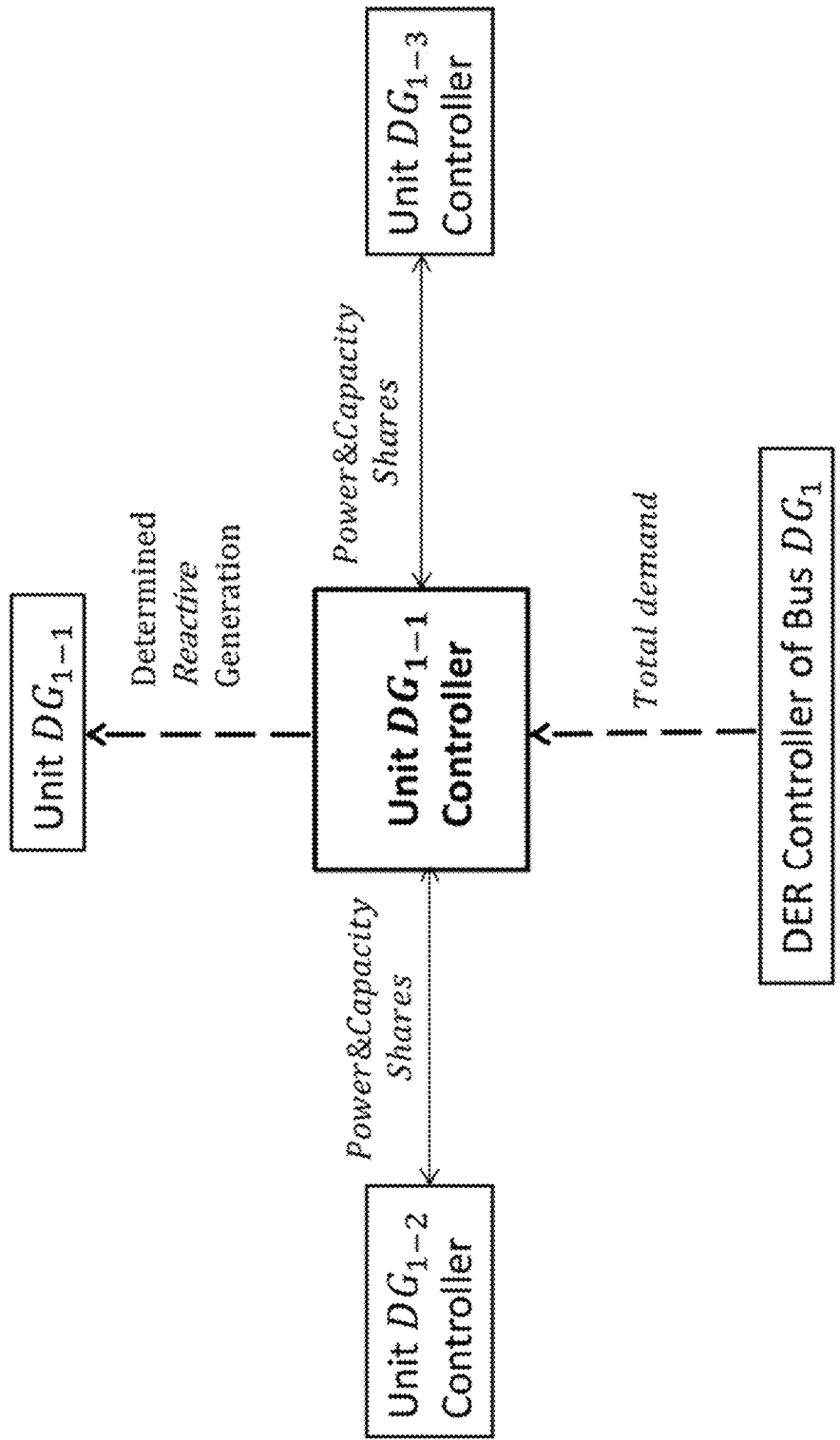
FIG. 9 is a flow chart for information exchange of a controller of the DER unit according to some embodiments of the invention.

FIG. 9 shows a flow chart for information exchange of a leading unit controller $DG_{1-1}$ upon receiving a command form the DER controller at bus $DG_1$. During the iterations, the controller $DG_{1-1}$ only receives information about its shares of reactive power and capacity from its neighbor unit controllers at unit $DG_{1-2}$, and $DG_{1-3}$, and transmits information about its share of reactive power and capacity to its neighbor unit controllers at unit $DG_{1-2}$, and $DG_{1-3}$. When the given number of iterations reached, it sends a command to the generation unit with the determined amount of reactive powers. For other non-leading unit, there is no information exchange with the DER controller at the bus.

The above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine. Typically the functionality of the program modules can be combined or distributed as desired in various embodiments.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A method for regulating voltages of a power distribution system including a substation transformer for providing power to loads through a set of buses connected by line segments, wherein the power distribution system includes at least one distributed energy resource (DER) for generating reactive power into the power distribution system, at least one DER controller operatively connected to the DER for controlling an amount of the generated reactive power, a plurality of DER units for each DER to share generating reactive power and each DER unit is controlled by a DER unit controller, wherein there are a plurality of DER unit controllers, and a monitoring controller located in a region of the DER for monitoring a voltage violation on at least one phase of a monitored bus, the method comprising:

determining, using a processor of the monitoring controller upon detecting the voltage violation, a set of phase current adjustments required to compensate the voltage violation on the monitored bus using equivalent impedances of a path of the power distribution system between the substation transformer and the monitored bus and a shift of phase angle on the path;

determining, by the processor of the monitoring controller, an amount of reactive power required to generate the determined phase current adjustments required to compensate the voltage violation on the monitored bus;

transmitting a request to the DER controller connected to the monitored bus to provide the determined reactive power to compensate the voltage violation;

determining, by the DER controller in communication with neighboring DER controllers, an amount of reactive power for the DER to be controlled by the DER controller;

transmitting a request by the DER controller, to a preselected leading DER unit controller, such that the preselected leading DER unit controller is preselected from the plurality of DER unit controllers of the DER and receives commands from the DER controller, wherein the preselected leading DER unit controller is in communication with neighboring DER unit controllers to reach consensus on a sharing portion of determined reactive powers for each DER unit according to that DER unit capacity; and controlling the DER unit by the DER unit controller to generate the determined sharing portion of reactive power.

2. The method of claim 1, wherein the path is a shortest path formed by a set of line segments connecting a primary side of the substation transformer and the monitored bus.

3. The method of claim 1, further comprising:

determining the shift of phase angle by using an aggregated voltage amplifying factor matrix of the path between the primary side of substation transformer and the monitored bus, which determined as a product of a voltage amplifying factor matrix of each voltage regulator, or transformer, or phase jumper, located between two adjacent buses on the path.

4. The method of claim 1, further comprising:

determining the equivalent impedance for three phases of the path by aggregating impedance matrices of three phases for each line segment on the path.

5. The method of claim 1, further comprising:

determining the reactive power required to compensate the voltage violation for a monitored phase of the monitored bus as an imaginary part of a product of a complex phase voltage on the monitored phase, and a conjugate of a phase current adjustment on the monitored phase, wherein the complex phase voltage on the monitored phase is defined by a magnitude as measured voltage magnitude of the bus on the monitored phase, and a phase as a shifted angle on the monitored phase, wherein the shifted angle on the monitored phase is determined as a sum of a base angle for the monitored phase and the shift of phase angle between the primary side of substation transformer and the monitored bus on the monitored phase, wherein the base angle is 0 degree for the first phase, −120 degrees for the second phase, and 120 degrees for the third phase, wherein the phase current adjustment is determined as a product of the equivalent impedance matrix of the path between the primary side of substation transformer and the monitored bus at a row corresponding to the monitored phase and a vector of complex phase voltage adjustments on all three phases, wherein complex phase voltage adjustment on a phase is defined with a magnitude as the voltage violation at the phase of the monitored bus, and an angle as the shifted angle on the phase.

6. The method of claim 1, further comprising:

determining the path as a shortest path between a primary side of the substation transformer and the monitored bus;

determining an equivalent impedance matrix of three phases for the path by aggregating an impedance matrix of three phases for each line segments on the path;

determining shift of the phase angle between the primary side of substation transformer and the monitored bus by aggregating shifts of the phase angle along the path caused by transformers, voltage regulators or phase jumpers on the path;

determining the reactive power required to compensate the voltage violation at the monitoring bus based on the equivalent impedance matrix, the shift of the phase angle and the voltage violation over upper or lower voltage bounds.

7. The method of claim 1, wherein the power distribution system includes a set of DER controllers including the DER controller closest to the monitored bus, further comprising:

requesting the DER controller closest to the monitored bus to provide the reactive power to compensate the voltage violation.

8. The method of claim 7, further comprising:

forwarding, by a processor of the DER controller, a portion of the requested reactive power evenly to neighboring DER controllers including one or combination of an immediate upstream DER controller and an immediate downstream DER controller.

9. The method of claim 8, wherein the portion is a half of the requested reactive power above a capacity of the DERs controlled by the DER controller.

10. The method of claim 8, further comprising:

forwarding recursively portions of the requested reactive power by the neighboring DER controllers until termination condition is met, wherein for each iteration, the portions are reduced by capabilities to generate the reactive power by DERs of the neighboring DER controllers forwarding the request.

11. The method of claim 1, wherein the amount of required reactive power for the DER is initialized with a summation of average reactive powers requests received from a cluster of monitored buses that communicatively connected to the DER controller, and reactive power requests received from a set of DER controllers that communicatively connected to the DER controllers.

12. A monitoring controller for monitoring a voltage violation on a monitored bus of a power distribution system, comprising:

a sensor for measuring a voltage at the monitored bus;

a memory for storing at least one threshold for values of the voltage and for storing equivalent impedances of a path of the power distribution system between a substation transformer and the monitored bus;

a processor for determining a shift of phase angle on the path, for comparing the measured voltage with at least one threshold to determine the voltage violation, and for determining, upon detecting the voltage violation, a set of phase current adjustments required to compensate the voltage violation on the monitored bus, and determining an amount of reactive power required to generate the determined phase current adjustments required to compensate the voltage violation on the monitored bus using the equivalent impedances and the shift of phase angle;

a transmitter for transmitting a request to provide the amount of reactive power into the power distribution system to compensate the voltage violation, such that the power distribution system requests from at least one distributed energy resource (DER) the amount of the requested reactive power;

one or more DER controller operatively connected to the at least one DER for controlling an amount of the generated reactive power, such that there a plurality of DER units for the at least one DER to share generating reactive power, wherein each DER unit is controlled by a DER unit controller, wherein there are a plurality of DER unit controllers; and a preselected leading DER unit controller is preselected from the plurality of DER unit controllers of the DER and receives commands from the DER controller.

13. The monitoring controller of claim 12, wherein the transmitter transmits the request to an upstream distributed energy resource (DER) controller or a downstream DER controller along line segments of the power distribution system.

14. The monitoring controller of claim 12, wherein the transmitter transmits the request to a distributed energy resource (DER) closest to the monitoring controller along line segments of the power distribution system.

15. The monitoring controller of claim 12, wherein the DER controller sends a request, via the transmitter, to the preselected leading DER unit controller, such that the preselected leading DER unit controller is in communication with neighboring DER unit controllers to reach consensus on a sharing portion of determined reactive powers for each DER unit according to that DER unit capacity, wherein the DER unit controller requests the DER unit to generate the determined sharing portion of reactive power.

16. The monitoring controller of claim 12, wherein the sensor is configured to measure the voltage on a phase of the bus that is below or above a predetermined threshold.

17. The monitoring controller of claim 12, wherein the sensor measures a current voltage on the bus, and the processor determines the voltage violation by comparing a measure voltage with thresholds, such that the thresholds are stored in the memory.

18. A method for regulating voltages of a power distribution system including a substation transformer for providing power to loads through a set of buses connected by line segments, wherein the power distribution system includes at least one distributed energy resource (DER) for generating reactive power into the power distribution system, at least one DER controller operatively connected to the DER for controlling an amount of the generated reactive power, a plurality of DER units for each DER to share generating reactive power and each DER unit is controlled by a DER unit controller, and a monitoring controller located in a region of the DER for monitoring a voltage violation on at least one phase of a monitored bus, the method comprising:

determining, using a processor of the monitoring controller upon detecting the voltage violation, a set of phase current adjustments required to compensate the voltage violation on the monitored bus using equivalent impedances of a path of the power distribution system between the substation transformer and the monitored bus and a shift of phase angle on the path;

determining, by the processor of the monitoring controller, an amount of reactive power required to generate the determined phase current adjustments required to compensate the voltage violation on the monitored bus;

transmitting a request to the DER controller connected to the monitored bus to provide the determined reactive power to compensate the voltage violation;

determining, by the DER controller in communication with neighboring DER controllers, an amount of reactive power for the DER to be controlled by the DER controller, wherein the amount of required reactive power for the DER is initialized with a summation of average reactive powers requests received from a cluster of monitored buses that are communicatively connected to the DER controller, and reactive power requests received from a set of DER controllers that are communicatively connected to the DER controllers;

transmitting a request by the DER controller, to a preselected leading DER unit controller, such that the preselected leading DER unit controller is preselected from the plurality of DER unit controllers of the DER and receives commands from the DER controller, wherein the preselected leading DER unit controller is in communication with neighboring DER unit controllers to reach consensus on a sharing portion of determined reactive powers for each DER unit according to that DER unit capacity; and controlling the DER unit by the DER unit controller to generate the determined sharing portion of reactive power.

19. The method of claim 18, wherein the average reactive powers requests received from the cluster of monitored buses that are communicatively connected to the DER controller are determined, by a sum of reactive power required for compensation of voltage violations on each monitored bus in the cluster, divided by a total number of monitored buses having voltage violations in the cluster.

* * * * *